United States Patent [19]

Clack

[11] Patent Number: 5,672,232
[45] Date of Patent: Sep. 30, 1997

[54] APPARATUS FOR PRODUCING TUBULAR PRODUCTS FROM NONWOVEN FIBERS

[75] Inventor: Robert A. Clack, Sun Prairie, Wis.

[73] Assignee: Clack Corporation, Windsor, Wis.

[21] Appl. No.: 312,717

[22] Filed: Sep. 27, 1994

Related U.S. Application Data

[62] Division of Ser. No. 48,281, Apr. 14, 1993, Pat. No. 5,366,576.

[51] Int. Cl.$^6$ ............................................. B37B 1/10
[52] U.S. Cl. .................. 156/429; 156/428; 156/167; 156/173; 425/83.1
[58] Field of Search ........................... 156/167, 169, 156/174, 175, 441, 429; 186/173, 180, 195, 428; 264/517, 518; 425/82.1, 83.1

[56] References Cited

U.S. PATENT DOCUMENTS

| | | | |
|---|---|---|---|
| 2,009,848 | 7/1935 | Keltie | 156/195 X |
| 2,997,737 | 8/1961 | Boggs et al. | 425/436 R |
| 3,424,831 | 1/1969 | Spatz | 264/334 |
| 3,790,329 | 2/1974 | Gampe | 425/436 R |
| 3,905,734 | 9/1975 | Blair | 425/224 |
| 3,909,174 | 9/1975 | Blair et al. | 425/224 |
| 3,933,557 | 1/1976 | Pall . | |
| 3,946,483 | 3/1976 | Holden et al. | 425/436 R |
| 3,998,919 | 12/1976 | Urquhart | 264/150 |
| 4,116,738 | 9/1978 | Pall | 156/174 |
| 4,291,453 | 9/1981 | Mathieu | 264/334 |
| 4,714,647 | 12/1987 | Shipp, Jr. et al. | 428/42 |
| 4,847,125 | 7/1989 | Schwarz . | |
| 5,145,689 | 9/1992 | Allen et al. | 425/72.2 |
| 5,340,479 | 8/1994 | Szczpanksi et al. | 210/497.1 |
| 5,409,642 | 4/1995 | Allen et al. | 156/167 X |

FOREIGN PATENT DOCUMENTS

| | | | |
|---|---|---|---|
| 28 32 663 | 2/1979 | Germany | 264/334 |
| 27 57 473 | 7/1979 | Germany | 264/334 |
| 61-14937 | 1/1986 | Japan | 264/334 |

*Primary Examiner*—Michael W. Ball
*Assistant Examiner*—Sam Chuan Yao
*Attorney, Agent, or Firm*—Nilles & Nilles

[57] ABSTRACT

A system produces segmented tubular products such as filters from nonwoven fibers and includes a die assembly, a collector assembly including a rotating mandrel, a withdrawer assembly, and a post-treatment assembly. The withdrawer assembly utilizes at least one threaded roller contacting either the inner or outer periphery of a tube formed on the mandrel to withdraw the tube from the mandrel in a controlled manner. The post-treatment assembly smoothes the outer surface of the tube prior to cutting by melting loose fiber strand strands extending therefrom. The properties of the finished product can be varied by altering the operation of the collector assembly and/or the withdrawer assembly.

20 Claims, 6 Drawing Sheets

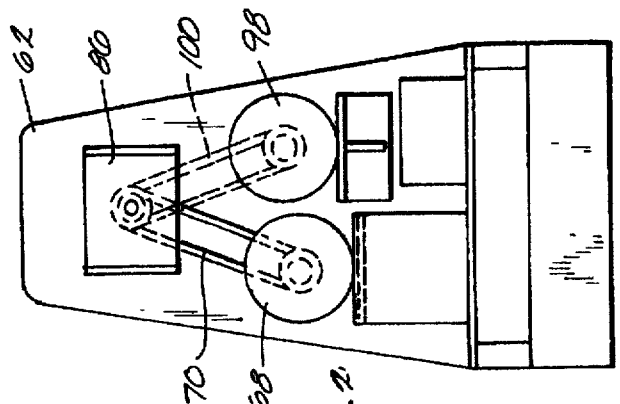
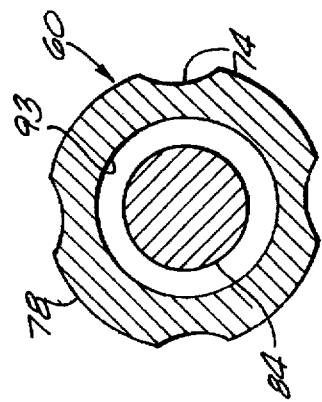
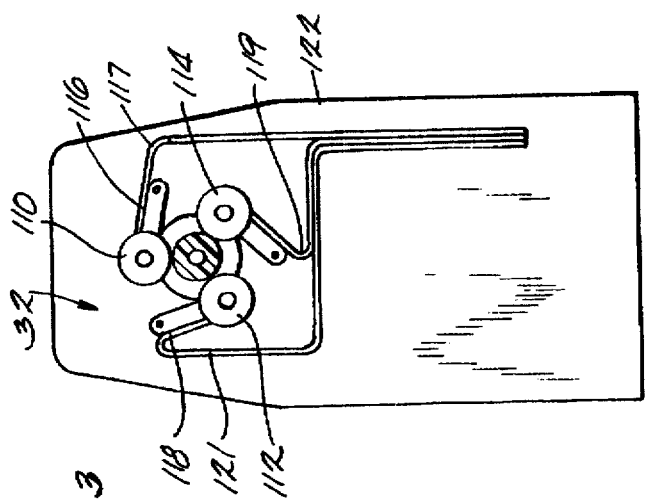
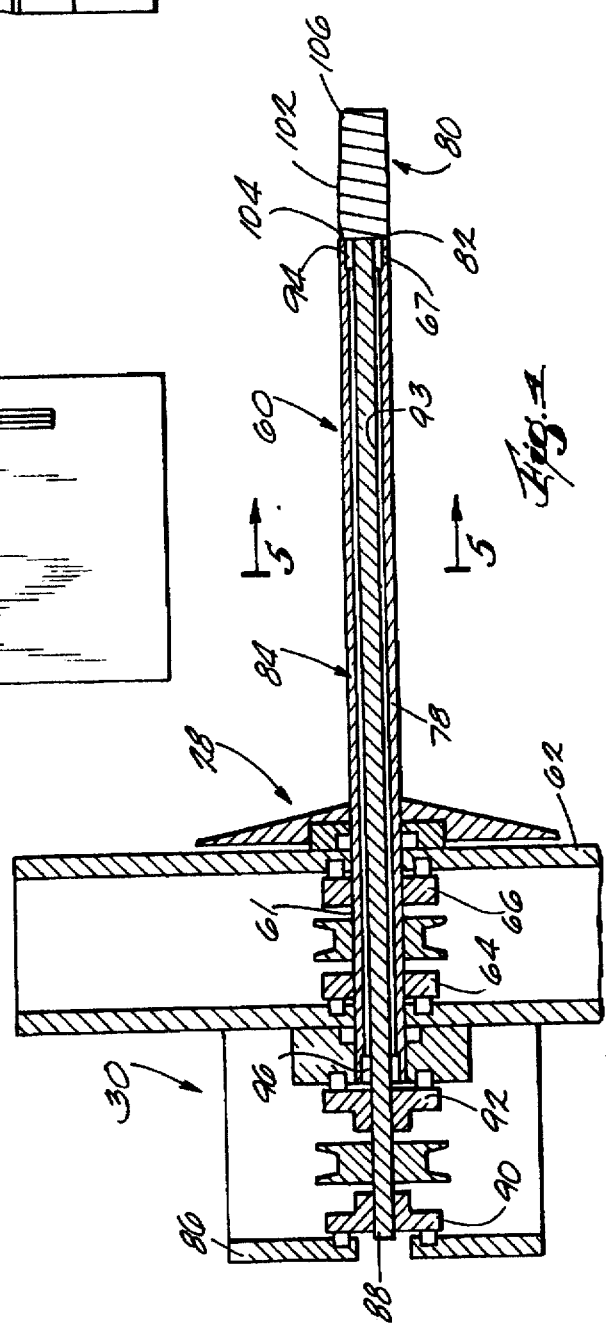

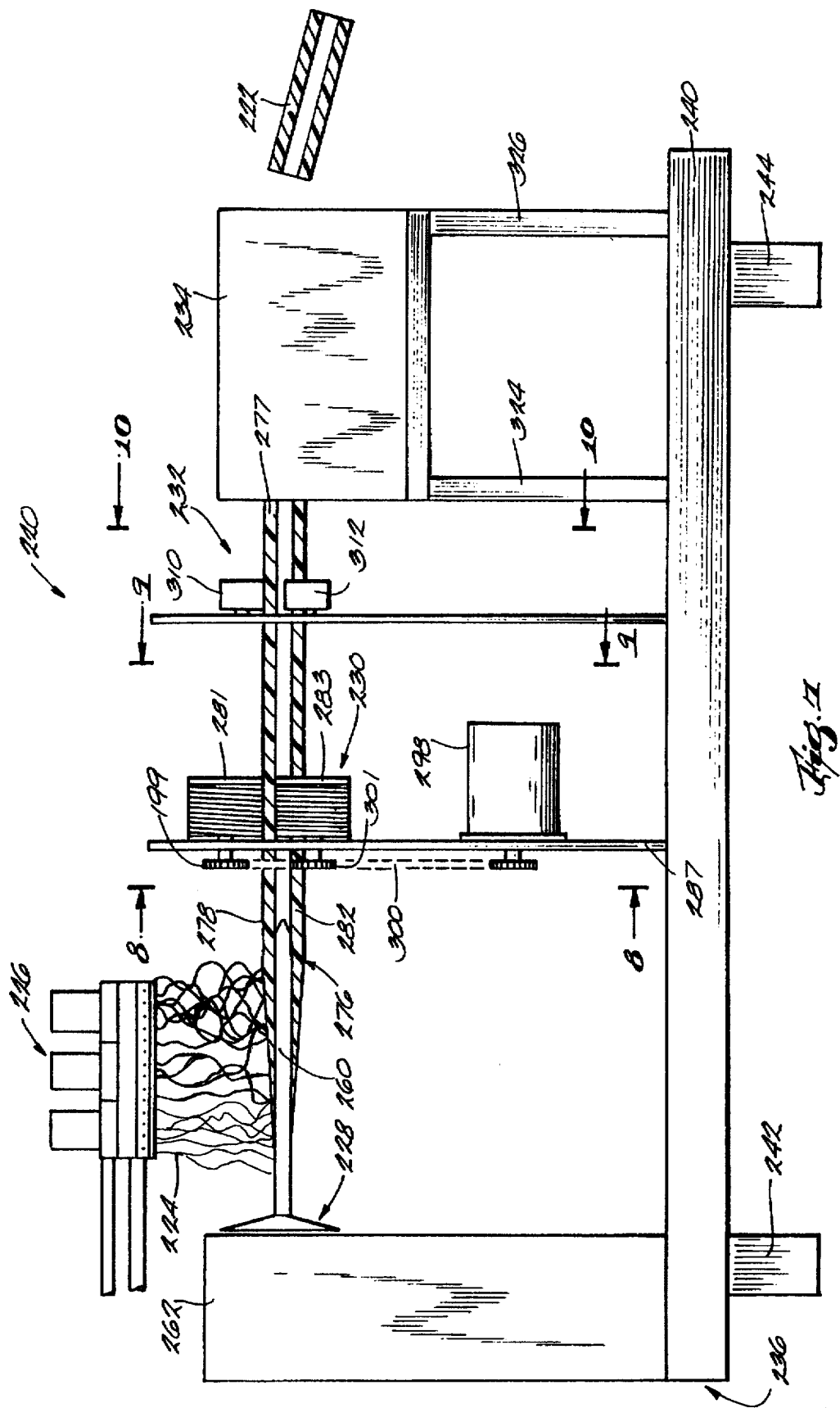

APPARATUS FOR PRODUCING TUBULAR PRODUCTS FROM NONWOVEN FIBERS

CROSS REFERENCE TO A RELATED APPLICATION

This application is a division of U.S. patent application Ser. No. 08/048,281, filed Apr. 14, 1993 and entitled "Method for Producing Tubular Products from Nonwoven Fibers," now U.S. Pat. No. 5,366,576.

BACKGROUND OF THE INVENTION

1. Field of the Invention

The invention relates to apparatus for forming tubular products and, more particularly, relates to apparatus for forming tubular products such as filters from nonwoven polymer fibers, and also relates to assemblies for withdrawing such products from the mandrels on which the products are formed.

2. Discussion of the Related Art

The production of tubular products such as filters from nonwoven fibers is becoming increasingly popular. Such products are typically manufactured by discharging nonwoven polymer fibers such as polypropylene from a die head or spinnerette and depositing the fibers onto a rotating mandrel. The fibers are intertwined and wrapped around the surface of the mandrel as they are deposited onto the mandrel, thus forming a tube. The tube is pulled axially along the mandrel as the fibers are deposited, thus producing a layered tubular element the thickness of which and porosity of which is determined by, among other things, the rotational velocity of the mandrel and the speed at which the tubular element is moved axially along the mandrel.

The production of a tubular element of the type described above requires that the element be withdrawn from the distal end of the mandrel during the manufacturing process, thus producing a continuous tube which is sawed or cut in some other manner to form the final tubular product. Several devices for withdrawing a tube from a mandrel are disclosed in U.S. Pat. No. 3,933,557, which issued to Pall on Jan. 20, 1976 (Pall '557); U.S. Pat. No. 4,116,738, which issued to Pall on Sep. 26, 1978 (Pall '738); and U.S. Pat. No. 4,847,125, which issued to Schwarz on Jul. 11, 1989 (Schwarz). Each of these patents discloses an apparatus for withdrawing a tube formed from nonwoven fibers from the mandrel via contact with a rotating element located at or downstream from the mandrel. Pall '557 and Pall '738 use canted rollers to withdraw the tube, and Schwarz uses gears of an unspecified construction. While each of these devices adequately withdraws the tube from the mandrel, each exhibits several drawbacks and disadvantages.

For instance, these systems are relatively bulky and complex. Moreover, because of slippage between the roller or other element and the tube, it is difficult to vary or even to control the speed at which the tube is withdrawn from the mandrel. Such control may be important because the rate of withdrawal can affect the properties of the tube being produced. Controlling the rate of withdrawal thus controls the properties of the tubes.

Moreover, none of these systems is capable of heat treating the tube in an in-line process.

OBJECTS AND SUMMARY OF THE INVENTION

It is therefore an object of the invention to provide a system for producing tubular products from nonwoven fibers which includes an assembly which can 1) withdraw the tube from the mandrel on which it is formed and 2) control the rate of tube withdrawal.

It is another object of the invention to provide a system including a tube withdrawer assembly of the type described above which is simple in construction, compact, and which permits the rate of withdrawal to be controlled.

In accordance with one aspect of the invention, these objects are achieved by providing a system comprising 1) a rotatable mandrel on which a tube is produced by depositing nonwoven fibers on the mandrel and which has a distal axial end, and 2) a roller which has a threaded surface which engages a peripheral surface of the tube and which draws the tube axially off from the mandrel. This arrangement prevents or at least inhibits slippage between the tube and the withdrawer assembly, thus permitting the desired control.

The threaded roller may contact an inner periphery of the tube, in which case the mandrel would preferably comprise a hollow tube having an open distal end and the threaded roller would be concentric with the mandrel and would be located adjacent the distal end of the mandrel. The roller would be mounted on a rotatable shaft which would extend through the mandrel.

Alternatively, the threaded roller could contact an outer periphery of the tube.

Other objects, features, and advantages of the invention will become more readily apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit and scope thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 2 is a front end view of a portion of the system of FIG. 1;

FIG. 3 is a sectional end view taken along the lines 3—3 in FIG. 1;

FIG. 4 is an enlarged sectional side elevation view of the collector and tube withdrawer assemblies of FIG. 1;

FIG. 5 is a sectional end view taken along the lines 5—5 in FIG. 4;

FIG. 7 is a side elevation view, illustrated partially schematically and partially in cross-section, of a system for producing segmented tubular products from nonwoven fibers, constructed in accordance with a second embodiment of the present invention;

DETAILED DESCRIPTION OF THE PREFERRED EMBODIMENT

Resume

Figure 1:
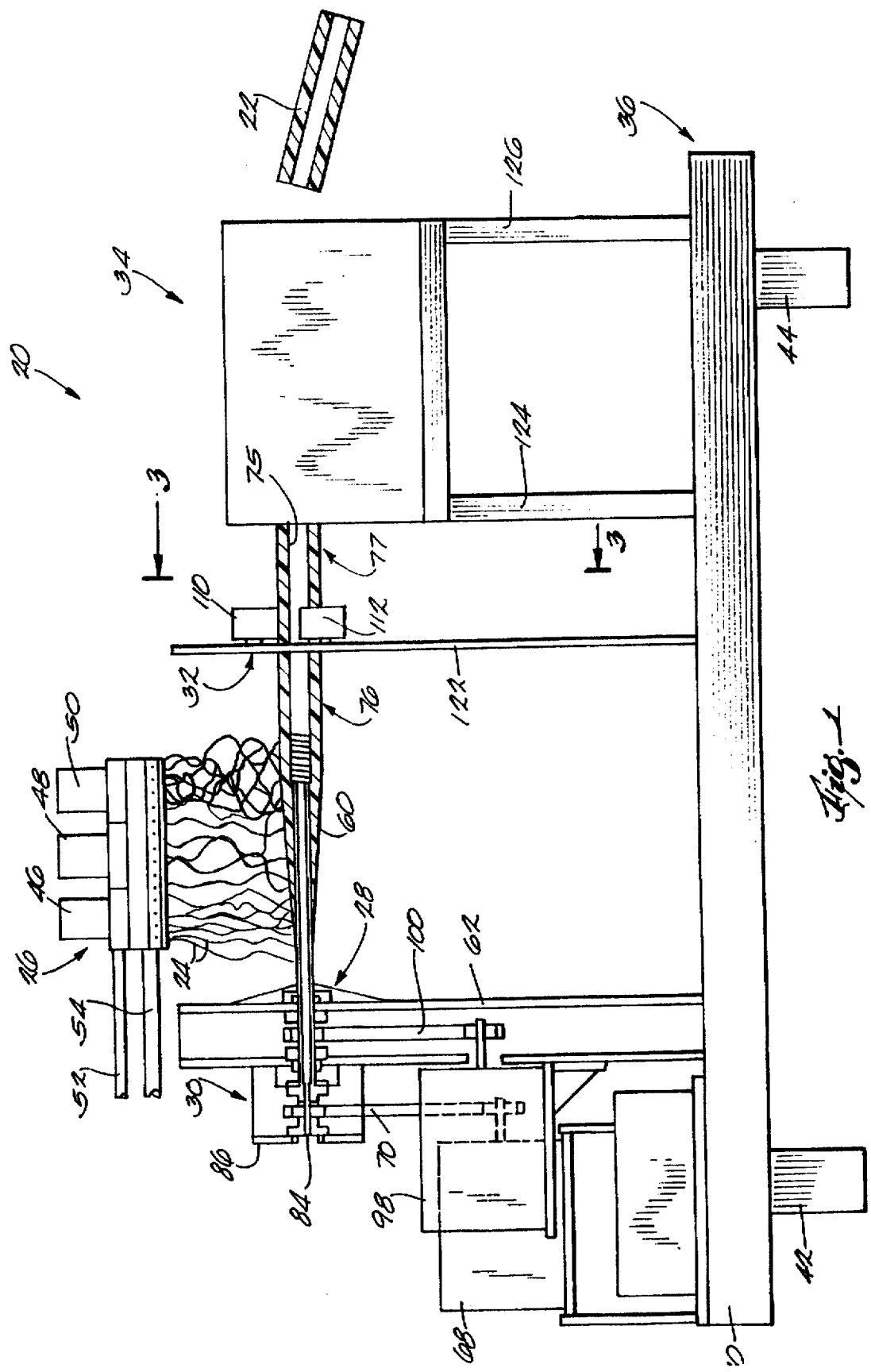
FIG. 1 is a side elevation view, illustrated partially schematically and partially in cross section, of a system for producing segmented tubular products from nonwoven fibers, constructed in accordance with a first embodiment of the invention.
Figure 6:
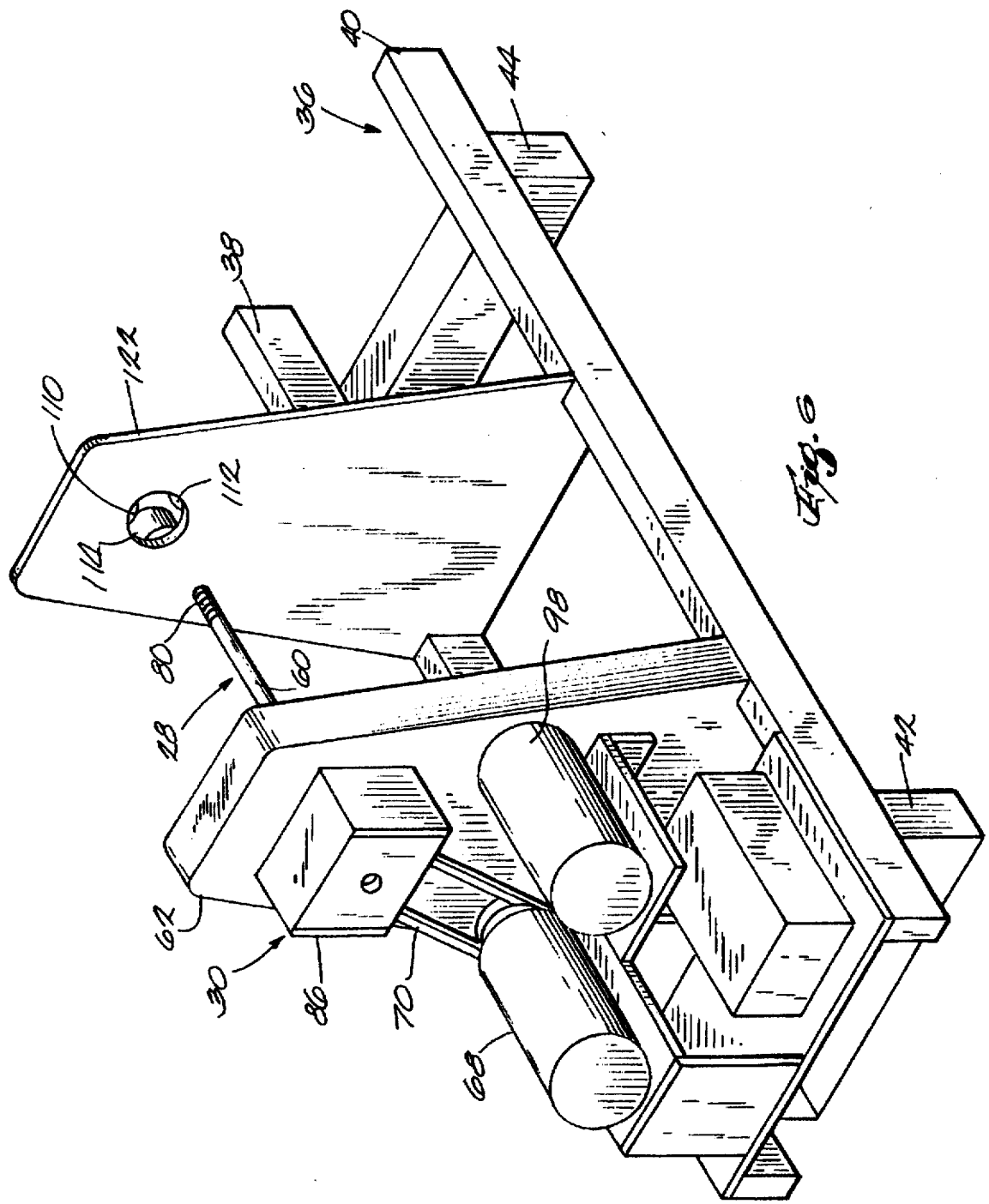
FIG. 6 is a perspective view of the collector, tube withdrawer, and post-treatment assemblies of the system of FIG. 1.
Figure 10:
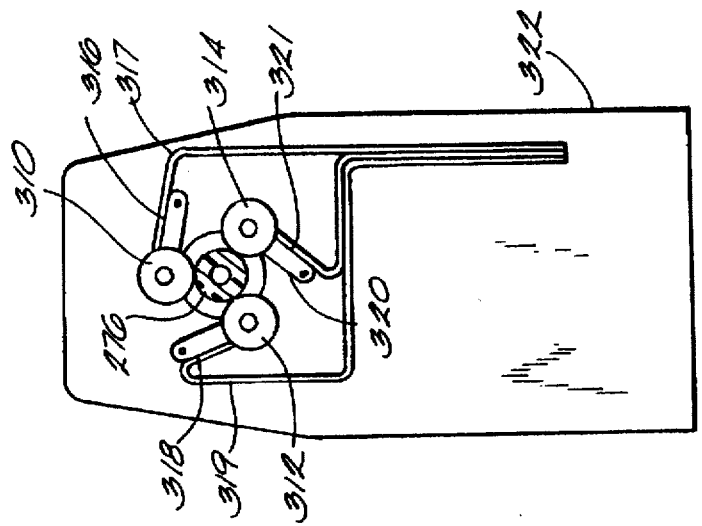
FIG. 10 is a sectional end view taken along the lines 10—10 in FIG. 7.
Figure 9:
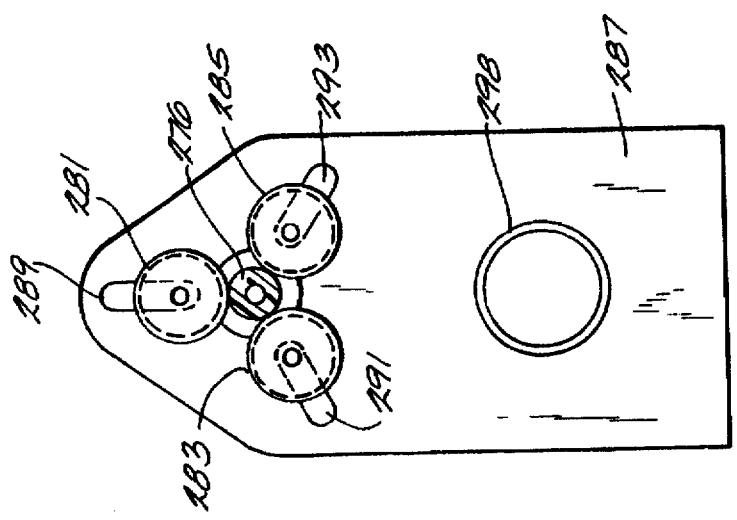
FIG. 9 is a sectional end view taken along the lines 9—9 in FIG. 7.
Figure 8:
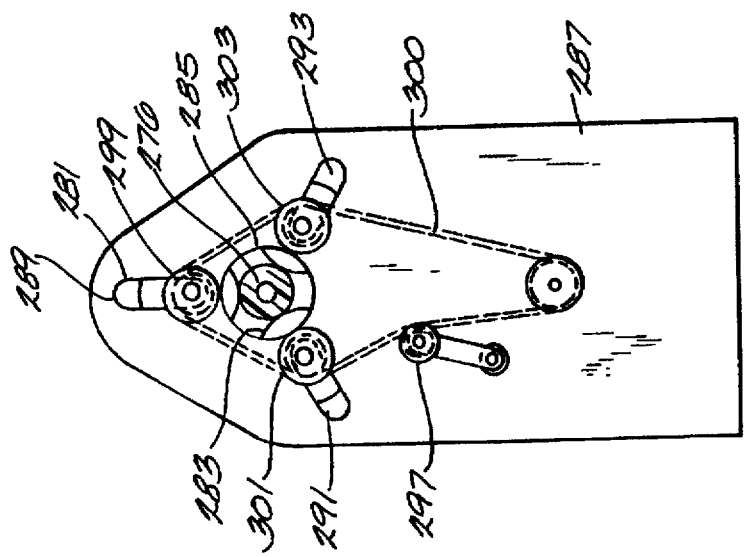
FIG. 8 is a sectional end view taken along the lines 8—8 in FIG. 7.
Figure 11:
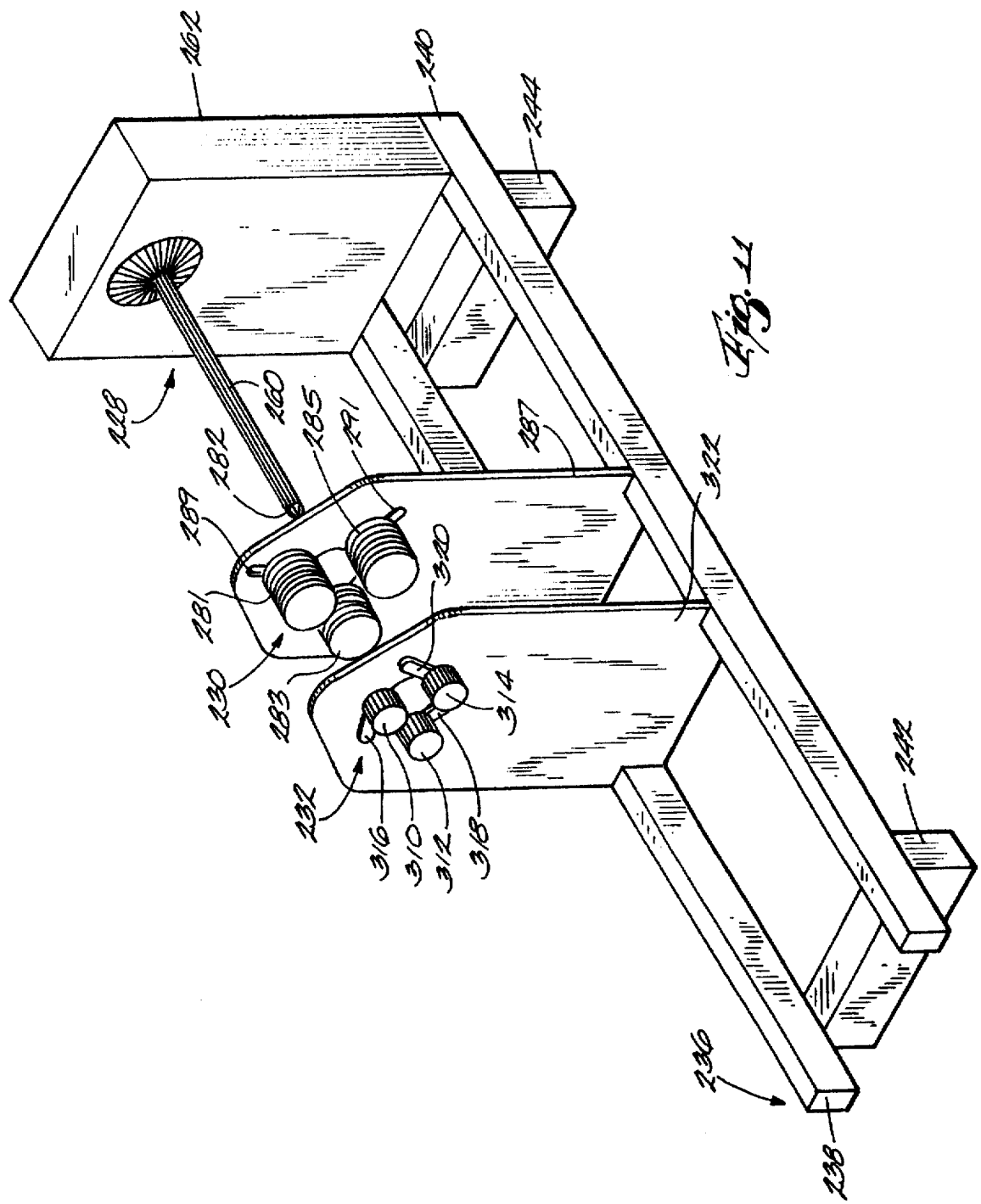
FIG. 11 is a perspective view of the collector, tube withdrawer, and post-treatment assemblies of FIG. 7.

Pursuant to the invention, a system is provided for producing segmented tubular products such as filters from nonwoven fibers. The system includes a die assembly, a collector assembly including a rotating mandrel, a withdrawer assembly, and a post-treatment assembly. The withdrawer assembly utilizes at least one threaded roller contacting either the inner or outer periphery of a tube formed on the mandrel to withdraw the tube from the mandrel in a controlled manner. The post-treatment assembly smoothes the outer surface of the tube prior to cutting by melting loose fiber strands extending therefrom. The properties of the finished product can be varied by altering the operation of the collector assembly and/or the withdrawer assembly.

Structure of System Employing Internal Tube Withdrawer

Referring now to FIGS. 1 through 6, a system 20 for producing segmented tubular products 22 from nonwoven fibers 24 includes a die assembly 26, a collector assembly 28, a tube withdrawer assembly 30, a post-treatment assembly 32, and a saw 34. The collector assembly 28, tube withdrawer assembly 30, post-treatment assembly 32, and saw 34 are all mounted on a common frame 36 which, in the illustrated embodiment, is provided in the form of a skid having longitudinal beams 38 and 40 supported on lateral legs 42 and 44.

Die assembly 26 is conventional and could be any device capable of producing nonwoven fibers. In the illustrated embodiment, assembly 26 produces melt-blown fibers and is divided into a plurality—in this case three—zones each having a respective gear pump 46, 48, 50 and receiving an extruded polymer (such as polypropylene) and heated air from common tubes 52 and 54, respectively. As is known in the art, die assembly 26 discharges strands of melt-blown fibers which at least partially solidify within a few inches of the die heads. Preferably, each of the zones has at least one orifice, with the orifices of the respective zones producing fibers of progressively-increasing diameter so that the products 22 may be used as depth filters having relatively large fibers with high porosity near the outer periphery 77 and relatively small fibers with low porosity near the inner periphery 75. As is clearly illustrated in the drawings, the three groups of orifices are aligned in a continuous row of side-by-side orifices. Of course, the die assembly 26 could be divided into any number of zones and need not produce fiber diameters of varying sizes.

Collector assembly 28 is located beneath the die assembly 26 and, in the illustrated embodiment, includes a mandrel 60 on which a tube 76 is formed by the deposition of nonwoven fibers thereon from die assembly 26. Referring to FIGS. 4 and 5, mandrel 60 has an inner end 61 rotatably mounted via bearings 64 and 66 on a support 62 which is in turn mounted on frame 36. Mandrel 60 also is hollow and has an open distal end 67, an inner peripheral surface 93, and an outer peripheral surface 78 having splines 74 formed therein which mesh with the inner periphery 75 of the tube 76 (FIGS. 1, 4, and 5). Mandrel 60 is driven to rotate by a variable speed electric motor 68 operatively connected to the mandrel by a suitable torque transfer element such as a belt 70.

In the illustrated embodiment, the tube withdrawer assembly 30 includes an internal withdrawer contacting the inner periphery 75 of tube 76 to withdraw the tube from the mandrel 60. Referring to FIGS. 1, 2, 4, and 5, withdrawer assembly 30 includes a threaded roller 80 mounted, adjacent the open distal end 67 of mandrel 60, on the rear end 82 of a shaft 84 the front end 88 of which is in turn rotatably mounted on a support 86 by bearings 90 and 92. As is clearly illustrated in the drawings, the rotating mandrel 60 traverses and is in alignment with a major portion of the row of orifices of the die assembly 26, and the threaded roller 80 traverses and is in alignment with a minor portion of the row of orifices. Shaft 84 extends through the hollow interior of mandrel 60 and is rotatably supported on the inner periphery 93 of the mandrel by bearings 94 and 96. Shaft 84 is driven to rotate by a variable speed electric motor 98 operatively connected to the shaft by a suitable torque transfer element such as a belt 100.

Roller 80 is concentric with mandrel 60, has at least one and preferably a plurality of helical threads 102 (FIG. 4) formed thereon, and should have a diameter generally equal to the outer diameter of mandrel 60. Roller 80 should also be shaped so as to minimize shear stresses on the tube 76 as the tube is withdrawn from the mandrel 60. In the illustrated embodiment, this is accomplished by bevelling the from and rear ends 104 and 106 of the roller 80 as illustrated in FIG. 4.

Post-treatment assembly 32, if present, could be any assembly which heats the outer peripheral surface 77 of the tube 76, before it is cut by saw 34, to melt loose strands of fibers extending from the surface of the tube, thereby smoothing the tube. For instance, the outer surface 77 of the tube 76 could be flame-treated or could be subjected to streams of hot air directed from conduit 54. In the illustrated embodiment, this heating is performed by heated rollers 110, 112, and 114 (best seen in FIG. 3) which engage the outer periphery of the tube and melt loose fibers thereof and which support the tube 76 as it is withdrawn from the mandrel 60. Rollers 110, 112, and 114 are rotatably mounted on spring-loaded pivot arms 116, 118, and 120 which are in turn pivotally mounted on a support 122 extending upwardly from frame 36. This support could be located downstream of mandrel 60 as illustrated, or could surround the mandrel 60 near its distal end 67. The outer peripheral surfaces of rollers 110, 112, and 114 are heated by resistive heating elements which are energized by wires 117, 119, and 121 and which are located in the bearings of the rollers. These rollers need not be heated by the illustrated resistive heating elements, but instead could be heated by any other means capable of heating the surfaces of the rollers 110, 112, and 114 to a sufficiently high temperature to melt the loose strands extending from the outer peripheral surface 77 tube 76. The arms 116, 118, and 120 apply sufficient biasing forces to the rollers 110, 112, and 114 to assure that the rollers contact the tube 76 with adequate pressure to support the tube 76 and to engage and melt the loose fibers extending from the outer surface 77 of tube 76 without damaging the tube.

Saw 34 is located downstream of post-treatment assembly 32 and cuts the tube 76, after it is withdrawn from the mandrel 60 and treated by assembly 32, to form the finished tubular element 22. Saw 34 is mounted on supports 124 and 126 and may be any conventional cutting element capable of cutting the tube 76 as the tube moves axially with respect to the frame 36. Additional support rollers can if necessary be provided downstream of the saw 34 to support the back end of the tube 76 during the curing process.

Operation of System Employing Internal Tube Withdrawer

Tube 76 is formed by depositing layers of melt-blown fibers 24 or the like from the die assembly 26 onto the outer peripheral surface 78 of mandrel 60 as the mandrel 60 is rotated by motor 68. The fibers 24 wrap around the rotating mandrel 60 to form the tube 76, which is pulled axially along the mandrel by withdrawer assembly 30, where more fibers 24 are deposited on the tube, thus producing a generally layered element. The boundaries between the layers of tube 76 are only vaguely defined because there is substantial intertwining between the fibers of adjacent layers.

As discussed above, a depth filter or other tube having a porosity which differs through its cross-section can be produced by varying the diameters of the fibers discharged by the various zones of the die, thus producing fibers of different diameters in the various layers of the tube 76. In addition to being varied by employing fibers of various thickness as discussed above, the porosity of each layer can be altered by varying the rotational velocity of the mandrel 60, thereby altering the properties of the tube thus produced. That is, the higher the rotational velocity, the tighter the fibers 24 will wrap around the mandrel, and the lower the porosity.

Tube 76 is withdrawn from the mandrel 60 as it is formed by the threaded roller 80. At the beginning of the process, the tube 76 may have to be formed on or attached to a cardboard tube or the like which is engaged by the roller 80 until the leading edge of the tube 76 is withdrawn from the mandrel 60. After initiation of the process, positive contact between the threads 102 of the roller 80 and the tube 76 prevents slippage between the roller and the tube, thus permitting effective control of the withdrawal process. Since the fibers 24 of the tube 76 shrink as they cool and crystalize, the tube 76 does not engage the outer periphery 78 of mandrel 60 very tightly, particularly at the rear end 82 of the mandrel, thus facilitating the withdrawal of the tube 76 from the mandrel 60. This may permit the dimensioning of roller 80 such that only inwardly protruding portions of the inner periphery 75 of tube 76 which had filled the splines 74 of mandrel 60 are contacted by the roller 80, thus preventing compacting of the majority of the fibers on the inner periphery of the tube 76 and preventing degradation of the tube. If necessary, cooling air can be forced through the space formed between the shaft 84 and the mandrel 60 to prevent shaft overheating. In addition, a cooling mist may if desired be applied to the fibers after they are discharged from the die head to increase porosity in a manner which is per se well known.

The rate at which the tube 76 is withdrawn from mandrel 60 is determined by the pitch of the threads 102 on roller 80 and by the difference in rotational velocity between the mandrel 60 and the roller 80. As a result, the thickness of tube 76 can be varied by altering either the speed of mandrel 60 or the speed of roller 80. The velocities of the mandrel 60 and the roller 80 could be varied manually by hand-operating a switch or some other device controlling the speed of motor 68 and/or motor 98. In more refined systems, variation of the velocities of motors 68 or 98 could be computer controlled and could involve an automatic feedback feature which detects one or more properties of the tubular segments 22 and which varies the speeds of the motors as required to obtain the desired properties. One possible feedback system could employ a laser gauge for measuring the outer diameter of the tube 76 as it is withdrawn from the mandrel 60 and could automatically vary the speed of the motor 68 and/or motor 98 to obtain the desired diameter. A particularly sophisticated system could continuously vary the rate of withdrawal such that the thicknesses of some of the layers of the tube 76 are greater than others in each segment 22.

Loose fiber strands extending from the outer periphery 77 of the tube 76 are melted via the heated rollers 110, 112, and 114 of the post-treatment assembly 32 after the tube 76 is withdrawn from the mandrel 60 by the tube withdrawer assembly 30, thus smoothing the outer peripheral surface 77 of the tube. If desired, these rollers could also compact slightly the soft, loose fibers on the outer peripheral surface 78 of the tube 76. The spring bias on arms 116, 118, and 120 is preferably adjustable to adjust the pressure inserted on the tube by the rollers 110, 112, 114.

After post-treatment, the tube 76 is cut at predetermined intervals by saw 34 to form the tubular segments 22.

The internal tube withdrawer assembly described above offers the advantages of being compact and of permitting accurate control of the rate of withdrawal of the tube from the mandrel. The system also permits the varying of the internal diameter of the tube by removing the roller 80, placing a sleeve over the mandrel 60, and by replacing the roller 80 with one of a greater diameter.

Internal tube withdrawers of the type described above may be particularly useful for the production of depth filters having 1) course, soft fiber layers near the outer periphery of the tube and 2) finer, less compressible layers near the inner periphery. Since any tube withdrawal technique necessarily requires the imposition of some compressive forces on the tube, compression of the tube can be minimized by applying the withdrawal forces to the less compressible inner periphery of the tube rather than to the more easily compressible outer periphery, thus permitting greater porosity at the outer portions of the tube.

It may in some instances, however, be desirable to employ an external tube withdrawer rather than an internal tube withdrawer, particularly if slight compression of the tube exterior is unimportant or is actually desired. Such an external tube withdrawer will now be described.

Construction and Operation of System Employing External Tube Withdrawer Assembly Referring now to FIGS. 7–11, a system will be described which differs from that illustrated in FIGS. 1–6 primarily in that it incorporates an external rather than an internal tube withdrawer assembly. Those elements corresponding to elements in the first embodiment are designated by reference numerals increased by 200 with respect to the corresponding reference numerals of the first embodiment.

Referring now to FIGS. 7–11, the system 220 produces a segmented tubular product 222 by depositing fibers 224 from a die assembly 226 onto a collector assembly 228 to form a tube 276. The tube 276 is withdrawn by a tube withdrawer assembly 230, treated by post-treatment assembly 232, and cut by saw 234 to form the segmented tubular product 222 as in the first embodiment detailed above. The collector assembly 228, withdrawer assembly 230, post-treatment assembly 232, and saw 234 are all mounted on a frame 236 in the form of a skid having longitudinal beams 238 and 240 supported on lateral legs 242 and 244.

Collector assembly 228 differs from that of the first embodiment in that the mandrel 260 comprises a solid rather than a hollow shaft. Mandrel 260 is rotatably mounted at its front end 288 on a support 262 incorporating an internal variable speed electric motor (not shown) for rotatably driving the mandrel 260, and has a free distal end 282 tapered to facilitate withdrawal of the tube 76 from the mandrel. The construction and operation of mandrel 260 are otherwise the same as the mandrel 60 of the first embodiment.

The withdrawer assembly 230 replaces the internal roller 80 of the first embodiment with a series of externally helically threaded rollers 281, 283, and 285 located downstream of mandrel 260. These rollers are mounted on a support 287, supported on frame 236, so as to extend around the outer periphery 277 of tube 276. Rollers 281, 283, and 285 are mounted in slots 289, 291, and 293 formed in support 287, have axes of rotation parallel to that of mandrel 260, and are tensioned into engagement with the outer periphery 277 of tube 276 by springs (not shown). Rollers 281, 283, and 285 are driven by a variable speed electric motor 298 via a torque transfer element such as a chain 300 tensioned by a spring loaded idler sprocket 297 (FIG. 8) into engagement with sprockets 299, 301, and 303 attached to the respective rollers 281, 283, and 285.

Post-treatment assembly 232 is identical in construction and operation to the post-treatment assembly 32 of the first embodiment and includes rollers 310, 312, and 314 which are heated by resistive heating elements energized by wires 317, 319, and 321 (FIG. 10) and which are rotatably mounted on spring-loaded pivoting arms 316, 318, and 320. Arms 316, 318, and 320 are mounted on a support 322 extending upwardly from frame 236.

Saw 234 is likewise identical to the saw 34 of the first embodiment and is mounted on frame 236 downstream of post-treatment assembly 232 by supports 324 and 326.

In use, the system of FIGS. 7 through 11 operates much the same as that of FIGS. 1 through 6, with a tube 276 being formed on mandrel 260 by the depositing of melt-blown fibers 224 onto the mandrel from the die assembly 226. The tube 276 is withdrawn from the mandrel 260 by the threaded rollers 281, 283, and 285 of the withdrawer assembly 230 at a rate determined by the pitch of the threads on the rollers 281, 283, and 285 and/or by the difference in rotational velocity between the rollers and the mandrel 260. As with the roller 80 of the first embodiment, using threaded rollers as opposed to canted rollers prevents or at least inhibits slippage between the rollers and the tube, thus permitting effective control of the withdrawal process.

The construction and operation of the system of FIGS. 7 through 11 is otherwise the same as that of FIGS. 1 through 6 and, accordingly, will not be described in greater detail.

Many changes and modifications could be made to the present invention without departing from the spirit or scope thereof. For instance, the roller 80 and mandrel 60 of the embodiment of FIGS. 1 through 6 need not be driven by separate motors, but could be driven by a single motor with appropriate gear reducers or even a transmission determining the speed differential between the mandrel and the roller.

Moreover, still other tube withdrawer assemblies could be utilized in place of those illustrated and described above. For instance, the tube could be expelled from the mandrel by axially moveable split rings provided on the exterior of the mandrel at its front end. These rings would rotate at the same velocity as the mandrel and would pulse forward and backward, e.g., under the operation of a cam, to push the whole tube rearwardly. Other changes and modifications which could be made without departing from the spirit or scope of the present invention will become more readily apparent by reading the appended claims.

I claim:

1. A system for forming tubular products from nonwoven fibers, said system comprising:
   A. a rotatable mandrel on which a tube is produced by depositing nonwoven fibers on said mandrel and which has a distal axial end; and
   B. a roller which has a surface 1) which presents helical threads, 2) which engages a peripheral surface of said tube, and 3) which draws said tube axially off from said mandrel, wherein an axis of rotation of said mandrel and an axis of rotation of said roller extend in the same direction.

2. A system as defined in claim 1, wherein said mandrel is splined so as to inhibit relative rotation between said mandrel and said tube.

3. A system as defined in claim 1, wherein said threaded roller contacts an inner peripheral surface of said tube.

4. A system as defined in claim 3, wherein said threaded roller is shaped so as to minimize shear on said inner peripheral surface of said tube.

5. A system as defined in claim 1, wherein said threaded roller contacts an outer peripheral surface of said tube, and wherein the axis of rotation of said roller is parallel to the axis of rotation of said mandrel.

6. A system as defined in claim 5, further comprising another threaded roller which contacts said outer peripheral surface of said tube.

7. A system as defined in claim 6, wherein said threaded rollers are driven by a common motor.

8. A system as defined in claim 1, further comprising a post-treatment assembly including a system of heated rollers which contact said tube.

9. A system as defined in claim 8, further comprising a saw, located downstream of said heated rollers, which cuts said tube into segments to form said tubular products.

10. A system as defined in claim 1, wherein said nonwoven fibers are melt-blown fibers, and further comprising a die which is located adjacent said mandrel and which has inlets receiving a melted polymer and heated air, respectively, and at least three orifices which discharge melt-blown fibers of progressively increasing diameter onto said mandrel.

11. A system as defined in claim 1, further comprising means for adjusting the rate of withdrawal of said tube from said mandrel.

12. A system as defined in claim 11, wherein said means for adjusting adjusts at least one of
   A. the rotational velocity of said mandrel, and
   B. a difference in rotational velocity between said mandrel and said threaded roller.

13. A system as defined in claim 1, further comprising a heated roller, located axially beyond said distal axial end of said mandrel, which contacts an outer peripheral surface of said tube and which melts loose strands thereon.

14. A system as defined in claim 1, further comprising a plurality of heated rollers, each of 1) which is located axially beyond said distal axial end of said mandrel, 2) contacts an outer peripheral surface of said tube, and 3) melts loose strands thereon, and further comprising a single motor which drives all of said heated rollers.

15. A system for forming tubular products from nonwoven fibers, said system comprising:
   A. a rotatable mandrel on which a tube is produced by depositing nonwoven fibers on said mandrel and which has a distal axial end; and B. a roller which has a threaded surface which engages an inner peripheral surface of said tube and which draws said tube axially off from said mandrel, wherein said mandrel comprises a hollow tube presenting an open distal end, and wherein said threaded roller is concentric with said mandrel and is located adjacent said distal end of said mandrel, and further comprising a rotatable shaft which extends through said mandrel and on which is mounted said threaded roller.

16. A system for forming tubular products from non-woven fibers, said system comprising:
   A. a rotatable mandrel on which a tube is produced by depositing nonwoven fibers on said mandrel and which has a distal axial end; and
   B. a roller which is concentric and coaxial with said mandrel and which has an outer surface, wherein said outer surface of said roller 1) presents helical threads, 2) engages an inner peripheral surface of said tube, and 3) draws said tube axially off from said mandrel.

17. A system for forming tubular products from non-woven fibers, said system comprising:
   A. a rotatable mandrel on which a tube is produced by depositing nonwoven fibers on said mandrel and which has a distal axial end; and
   B. a roller which is concentric with said mandrel and which has a threaded surface which engages an inner peripheral surface of said tube and which draws said tube axially off from said mandrel, wherein said mandrel comprises a hollow tube presenting an open distal end, and further comprising a rotatable shaft which extends through said mandrel and on a distal end of which is mounted said threaded roller.

18. A system for forming tubular products from non-woven fibers, said system comprising:
   A. a rotatable mandrel on which a tube is produced by depositing nonwoven fibers on said mandrel, wherein said mandrel comprises a hollow tube presenting an open distal end;
   B. a rotatable shaft which extends through said mandrel, which is concentric with said mandrel, and which presents a distal end located beyond and adjacent to said distal end of said mandrel; and
   C. a roller which is mounted on said distal end of said rotatable shaft, which has a diameter generally equal to the outer diameter of said mandrel, and which has a threaded surface which engages an inner peripheral surface of said tube and which draws said tube axially off from said mandrel.

19. An apparatus for producing seamless continuous non-woven tubes which includes a die for spinning filaments onto a rotating mandrel to form a continuous tube of nonwoven filaments thereon, the improvement wherein the mandrel comprises:
   (a) a hollow outer shaft;
   (b) an inner shaft extending through the outer shaft and having an end portion extending axially outwardly from the outer shaft, the end portion being threaded and in combination with the outer shaft being positioned in relation to the die to receive and wind filaments thereon;
   (c) means for rotating the inner and outer shafts independently at the rate for receiving a layer of filaments on the outer shaft and the end portion of the inner shaft; and
   (d) means for rotating the inner shaft at an rpm different than the outer shaft whereby the rotating threads of the end portion of the inner shaft engages the tube of nonwoven filaments forcing the tube to move axially along the outer shaft.

20. The apparatus of claim 19 wherein the die comprises a row of orifices and the rotating mandrel is aligned with the row of orifices whereby the outer shaft traverses and is in alignment with a major portion of the row of orifices, and the threaded portion of the inner shaft traverses and is in alignment with a minor portion of the row of orifices.

* * * * *